(12) United States Patent
Vorderbruggen et al.

(10) Patent No.: US 11,193,054 B2
(45) Date of Patent: Dec. 7, 2021

(54) BIOLOGICALLY MEDIATED PRECIPITATION OF CARBONATES FOR USE IN OILFIELD APPLICATIONS

(71) Applicant: Baker Hughes, a GE company, LLC, Houston, TX (US)

(72) Inventors: Mark A. Vorderbruggen, Spring, TX (US); Charles D. Armstrong, Tomball, TX (US); Michael Brendt Wilson, Tomball, TX (US); Harold Dean Brannon, Magnolia, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/333,022

(22) PCT Filed: Sep. 28, 2017

(86) PCT No.: PCT/US2017/053991
§ 371 (c)(1),
(2) Date: Mar. 13, 2019

(87) PCT Pub. No.: WO2018/064320
PCT Pub. Date: Apr. 5, 2018

(65) Prior Publication Data
US 2019/0264091 A1 Aug. 29, 2019

Related U.S. Application Data

(60) Provisional application No. 62/401,987, filed on Sep. 30, 2016.

(51) Int. Cl.
| | | |
|---|---|---|
| C09K 8/582 | (2006.01) |
| C09K 8/467 | (2006.01) |
| C09K 8/516 | (2006.01) |
| C09K 8/575 | (2006.01) |
| C09K 8/80 | (2006.01) |
| C09K 8/506 | (2006.01) |
| C04B 28/02 | (2006.01) |
| C04B 40/06 | (2006.01) |
| C04B 103/00 | (2006.01) |

(52) U.S. Cl.
CPC ............ *C09K 8/582* (2013.01); *C04B 28/02* (2013.01); *C04B 40/0675* (2013.01); *C09K 8/467* (2013.01); *C09K 8/506* (2013.01); *C09K 8/516* (2013.01); *C09K 8/575* (2013.01); *C09K 8/80* (2013.01); *C04B 2103/0001* (2013.01)

(58) Field of Classification Search
CPC ........ C09K 8/582; C09K 8/506; C09K 8/467; C09K 8/516; C09K 8/575; C09K 8/80; C04B 28/02; C04B 40/0675; C04B 2103/0001
See application file for complete search history.

(56) References Cited

U.S. PATENT DOCUMENTS

| | | | | |
|---|---|---|---|---|
| 5,143,155 A | * | 9/1992 | Ferris | B09C 1/00 |
| | | | | 166/246 |
| 2006/0281167 A1 | | 12/2006 | Crews | |
| 2009/0264321 A1 | | 10/2009 | Showalter et al. | |
| 2010/0209968 A1 | | 8/2010 | Akers et al. | |
| 2011/0027850 A1 | | 2/2011 | Crawford et al. | |
| 2015/0122486 A1 | * | 5/2015 | Luke | C04B 28/02 |
| | | | | 166/246 |
| 2016/0017208 A1 | | 1/2016 | Coates | |

FOREIGN PATENT DOCUMENTS

| | | | |
|---|---|---|---|
| EP | 2354099 A1 | | 8/2011 |
| WO | WO 2008/119620 | * | 10/2008 |
| WO | WO2009/008724 | * | 1/2009 |
| WO | WO 2009/008724 | * | 1/2009 |
| WO | 2010129940 A2 | | 11/2010 |

OTHER PUBLICATIONS

Altunina, L.K. et al., Enzymatic generation of oil-displacing systems under conditions of low temperature viscosity oil reservoirs, SPE-176723-MS, 2015, p. 1-7.*
Wei, S., et al., Biomineralization processes of calcite induced by bacteria isolated from marine sediments, Brazilian Journal of Microbiology 2015, 46, 455-464.*
Altunina et al., Enzymatic Generation of Oil-Displacing Systems under Conditions of Low-Temperature Viscosity-Oil Reservoirs, SPE-176723-MS, 7 pages.
Cunningham, A.B. et al., "Wellbore leakage mitigation using engineered biomineralization", Energy Procedia, 2014, vol. 63, pp. 4612-4619Cunningham, A.B. et al., "Wellbore leakage mitigation using engineered biomineralization", Energy Procedia, 2014, vol. 63, pp. 4612-4619.
European Search Report for European Application No. 17857411.7 dated Nov. 21, 2019, 17 pages.
International Search Report for International Application No. PCT/US2017/053991, International Filing Date Sep. 28, 2017, dated Jan. 4, 2018, 3 pages.
Phillips, Adrienne J. et al., "Potential CO2 leakage reduction through biofilm-induced calcium carbonate precipitation", Environmental Science & Technology, 2012, vol. 47, No. 1 pp. 142-149.
Volodymyr et al., Applications of microorganisms to geotechnical engineering for bioclogging and biocementation of soil in situ, Rev. Environ Sci Sbiotechnol (2008) 7: 139-153.
Written Opinion for International Application No. PCT/US2017/053991, International Filing Date Sep. 28, 2017, dated Jan. 4, 2018, 7 pages.

* cited by examiner

*Primary Examiner* — Kumar R Bhushan
(74) *Attorney, Agent, or Firm* — Cantor Colburn LLP

(57) ABSTRACT

A method of enhancing carbonate precipitation in a downhole environment comprises introducing into the downhole environment a treatment composition comprising: a carbonate producing agent comprising a microbe, an enzyme, or a combination comprising at least one of the foregoing, and a substrate comprising N-oxyurea, semicarbazide, N,N-dioxyurea, or a combination comprising at least one of the foregoing. An organic feedstock and a geobacter can also be used to treating a wellbore or a subterranean formation. Encapsulated carbonate producing agent such as encapsulated bacterial spores are used to form self-healing cemented structure in a downhole environment.

9 Claims, No Drawings

BIOLOGICALLY MEDIATED PRECIPITATION OF CARBONATES FOR USE IN OILFIELD APPLICATIONS

CROSS REFERENCE TO RELATED APPLICATIONS

This is U.S. National Stage of Application No. PCT/US2017/053991, filed on. Sep. 28, 2017, which claims the benefit of U.S. Application No. 62/401,987 filed on Sep. 30, 2016, the disclosures of both of which are incorporated herein by reference in their entirety.

BACKGROUND

The disclosure is directed to methods of precipitating carbonates for downhole applications, and in particular to biologically mediated precipitation of carbonate salts in downhole environments.

Various downhole operations involve the consolidation of particles. For example, in a cementing operation, sand grains are cemented or bonded together using a cementitious material such as Portland cement. In a frac pack operation, proppants can be consolidated using a binder to form a fluid permeable pack that reduces or substantially prevents the passage of formation particles from the subterranean formation into a wellbore while allows passage of formation fluids from the subterranean formation into the wellbore. Binders can also be used to bond together a weak or unconsolidated formation thereby reducing formation sand induced problems with hydrocarbon production. Although various methods and materials are known in the art, the oil and gas industry is always receptive to alternative methods/materials for consolidating particles in downhole environments.

BRIEF DESCRIPTION

A method of enhancing carbonate precipitation in a downhole environment comprises introducing into the downhole environment a treatment composition comprising: a carbonate producing agent comprising a microbe, an enzyme, or a combination comprising at least one of the foregoing, and a substrate comprising N-oxyurea, semicarbazide, N,N-dioxyurea, or a combination comprising at least one of the foregoing; and forming a carbonate precipitate; wherein greater than about 70 wt % of the substrate is consumed in one or more reactions to produce the carbonate precipitate.

A method of treating a wellbore or a subterranean formation comprises injecting into the wellbore or the subterranean formation a treatment composition comprising: an organic feedstock; a sugar source, a geobacter effective to oxidize the organic feedstock to produce carbon dioxide; and forming a carbonate precipitate.

A method of forming a self-healing cemented structure in a downhole environment comprises: injecting into the downhole environment a treatment composition comprising: an aqueous carrier; an aggregate; a cementitious material; and a self-healing composition comprising: an encapsulated carbonate producing agent containing a core of a microbe, an enzyme, a geobacter, or a combination thereof and a shell of an encapsulant; and a substrate comprising urea, N-oxyurea, semicarbazide, N,N-dioxyurea, an organic feedstock, or a combination comprising at least one of the foregoing, and forming a self-healing cemented structure.

DETAILED DESCRIPTION

Urea, metal ions, and carbonate producing enzymes or microbes or a combination thereof can be used to produce a carbonate precipitate such as calcite, which then cements or bonds solid particles together. However, it has been found that during the process to precipitate carbonates, not all of the urea is consumed. To enhance the precipitation of carbonates, the inventors have used a substrate that has less affinity to the active sites of the carbonate producing enzymes or microbes as compared to urea. In particular, the inventors have discovered that when a substrate such as N-oxyurea, semicarbazide and/or N,N-dioxyurea, or a combination comprising at least one of the foregoing is used, either alone or in combination with urea, more substrate can be eventually converted to a carbonate precipitate. Accordingly, the inventors have found a new method that can lead to less waste and a stronger product.

Without wishing to be bound by theory, it is believed that the precipitation of carbonates by microbes or enzymes is a multistep process where the first step is the breakdown of urea into carbon dioxide by microbes or enzymes. In the presence of water this carbon dioxide hydrolyzes to carbonic acid which then precipitates as an insoluble carbonate by reaction with cations such as calcium, iron, or other ions. Further without wishing to be bound by theory, it is believed that the conversion of carbon dioxide to carbonic acid is a limiting step. When urea is used, the enzymatic pathway occurs too fast to utilize all of the urea. By using less preferred substrates such as N-oxyurea, semicarbazide and/or N,N-dioxyurea, or a combination comprising at least one of the foregoing, the catalytic mechanism is slowed down just enough so that the breakdown of the substrate and the formation of carbonic acid have matching reaction rates thus driving the reaction to completion. This would, in turn, produce a stronger product as more substrates will be converted into carbonate precipitates.

Accordingly, a method of enhancing carbonate precipitation in a downhole environment comprises: introducing into the downhole environment a treatment composition comprising: a carbonate producing agent comprising a microbe, an enzyme, or a combination comprising at least one of the foregoing, and a substrate comprising N-oxyurea, semicarbazide, N,N-dioxyurea, or a combination comprising at least one of the foregoing, and forming a carbonate precipitate. Other substrates that have less affinity for the active site of the carbonate producing agents as compared to urea can also be used. Additionally, combinations of the substrates can slow the reaction further through competitive inhibition mechanisms to allow the reaction to progress further toward completion.

By using the method, greater than about 70 wt %, greater than about 80 wt %, or greater than 90 wt % of the substrate is consumed in one or more reactions to produce the carbonate precipitate. Further, the method has improved yield as compared to a reference method where urea is used instead of a substrate comprising N-oxyurea, semicarbazide, N,N-dioxyurea, or a combination comprising at least one of the foregoing. Specifically, the method can be effective to produce a carbonate precipitate with a yield of greater than about 65%, greater than about 75%, greater than 85%, or greater than 95%. The yield of a carbonate is obtained by dividing the actual yield of a carbonate precipitate over the theoretical yield of a carbonate precipitate. The substrate is a limiting agent. The theoretical yield is calculated based on the amount of the substrate used in the reaction.

The substrate can further comprise urea, for example greater than zero percent to less than 40 wt % of urea, greater than zero percent to less than 20 wt % or urea, or greater than zero percent to less than 5 wt % of urea. In an embodiment, the substrate is free of urea.

The substrate can be provided in various forms. In an embodiment, the substrate is provided as an aqueous solution in water. The substrate can also be combined in a dry state with other components of the treatment composition.

The effective amount of the substrate depends on the amount of the other components and is enough to ensure the formation of a structure/material having the desired strength at a desired rate. In an embodiment, the effective amount of the substrate in the treatment compositions is about 5 mM to about 2 M or about 100 mM to about 1.5 M or about 800 mM to about 1.2 M.

The carbonate producing agent in the treatment compositions comprises a microbe, an enzyme, or a combination comprising at least one of the foregoing.

Microbes that have the ability to induce the precipitation of carbonates include those from the genera such as *Bacillus* sp., *Sporosarcina* sp., *Spoloactobacilus* sp., *Clostridium* sp., *Desulfotomaculum* sp. or a combination thereof. Exemplary and non-limiting microbes include *Sporosarcina pasteurii* (formerly known as *Bacillus pasteurii*), *Bacillus megaterium*, *Sporosarcina ureae*, *Pseudomonas aeruginosa*, *Proteus Vulgaris*, *Bacillus sphaericus*, *Myxococcus xanthus*, *Leuconostoc mesenteroides*, *Bacillus subtilis*, *Deleya halophila*, *Halomonas eurihalina*, *Proteus mirabilis* and *Helicobacter pylori*. Non-pathogenic strains are preferred. *Sporosarcina pasteurii* is specifically mentioned. A combination of different microbes may be used. As used herein, the microbe includes bacteria and bacteria spores. In an embodiment, the treatment composition contains about $1.0 \times 10^3$ to $1.0 \times 10^8$ bacterial spores/bacteria per gram of the particles to be consolidated.

Suitable carbonate precipitating enzymes include urease (EC 3.5.1.5), amidase (EC 3.5.1.4), carbonic anhydrase (EC 4.2.1.1), glutamate dehydrogenase such as NAD(P) type (EC 1.4.1.3), glutamate synthase such as NADPH type (EC 1.4.1.13) and FAD type (EC 1.4.7.1). Urease is specifically mentioned. Urease is commercially available. It can be extracted from Jack beans (*Canavalia ensiformis*), watermelon seeds, pea seeds, soy beans, and the like. In an embodiment, the treatment compositions contain about 0.5 M to about 1.0 M or about 0.25 M to about 2.0 M, or about 0.01 M to about 1.0 M of enzymes.

Geobacters can be used in bioremediation to break down an organic feedstock, converting them into carbon dioxide. Accordingly, in some embodiments, a method of treating a wellbore or a subterranean formation comprises injecting into the wellbore or the subterranean formation a treatment composition comprising: an organic feedstock; a sugar source, a geobacter effective to oxidize the organic feedstock to produce carbon dioxide; and forming a carbonate precipitate.

The organic feedstock comprises proteins, fatty acids, and the like.

The geobacter comprises proteobacteria. Exemplary proteobacteria include, but are not limited to, alphaproteobacteria, betaproteobacteria, gammaproteobacteria, deltaproteobacteria, and epsilonproteobacteria.

The sugar source includes a glycol, lactose, glucose, fructose, or the like.

In an embodiment, the carbonate producing agent or the geobacter is present in an amount effective to complete the reactions to form the carbonate precipitates in about 10 minutes to about 48 hours, about 30 minutes to about 36 hours, about 1 hour to about 24 hours, or about 2 hours to about 20 hours in a wellbore or a subterranean formation.

The carbonate precipitate is formed in the presence of a cation source. The cation sources are not particularly limited and include any material that is effective to form a low-solubility carbonate salt or precipitate with carbonic acid under downhole conditions. As used herein, a low-solubility carbonate salt or precipitate refers to a material that has a water solubility of less than about 0.1 g/100 mL at 25° C. and atmospheric pressure. In some embodiments, the cation sources comprise ions of Be, Mg, Ca, Sr, Ba, Mn, Fe, Co, Ni, Cu, Ag, Zn, Cd, Al, Tl, Pb, Bi, or a combination comprising at least one of the foregoing. A calcium ion source is specifically mentioned.

Exemplary cation sources include calcium chloride, calcium bromide, calcium nitrate, calcium oxide, calcium hydroxide, beryllium sulfate, beryllium nitrate, beryllium chloride, magnesium chloride, magnesium sulfate, magnesium oxide, magnesium hydroxide, strontium sulfate, strontium nitrate, barium chloride, barium bromide, barium acetate, barium sulfide, manganese chloride, manganese nitrate, manganese sulfate, manganese bromide, iron chloride, iron sulfate, iron nitrate, cobalt chloride, cobalt sulfate, cobalt nitrate, cobalt sulfate, copper nitrate, copper bromide, copper chloride, copper sulfate, nickel chloride, nickel bromide, nickel nitrate, nickel sulfate, zinc chloride, zinc nitrate, zinc oxide, zinc sulfate, or a combination comprising at least one of the foregoing.

In an embodiment, the cation source is present in an amount effective to provide about 2 mM to about 2.5 M, about 10 mM to about 2 M, or about 250 mM to about 1.8 M cations in the treatment compositions. In the event that a liquid carrier or the subterranean formation contains sufficient amount of a cation source, no additional cation source needs to be separately added.

The treatment compositions can further comprise an aqueous carrier fluid. The aqueous carrier fluid is present in an amount of about 10% to about 99% by weight, more specifically in an amount of about 20% to about 99% by weight, based on the total weight of the treatment compositions depending on the end use of the compositions. The aqueous carrier fluid can be fresh water, brine (including seawater), an aqueous base, or a combination comprising at least one of the foregoing. It will be appreciated that other polar liquids such as alcohols and glycols, alone or together with water, can be used in the carrier fluid.

The brine can be, for example, seawater, produced water, completion brine, or a combination comprising at least one of the foregoing. The properties of the brine can depend on the identity and components of the brine. Seawater, for example, can contain numerous constituents including sulfate, bromine, and trace metals, beyond typical halide-containing salts. Produced water can be water extracted from a production reservoir (e.g., hydrocarbon reservoir) or produced from an underground reservoir source of fresh water or brackish water. Produced water can also be referred to as reservoir brine and contain components including barium, strontium, and heavy metals. In addition to naturally occurring brines (e.g., seawater and produced water), completion brine can be synthesized from fresh water by addition of various salts for example, KCl, NaCl, $ZnCl_2$, $ZnBr_2$, $MgCl_2$, $CaCl_2$, or $CaBr_2$ to increase the density of the brine, such as 15 or 10.6 pounds per gallon of brine. Completion brines typically provide a hydrostatic pressure optimized to counter the reservoir pressures downhole. The above brines can be modified to include one or more additional salts. The additional salts included in the brine can be NaCl, KCl, NaBr, $MgCl_2$, $CaCl_2$, $CaBr_2$, $ZnBr_2$, $NH_4Cl$, sodium formate, cesium formate, and combinations comprising at least one of the foregoing. The NaCl salt can be present in the brine in an amount of about 0.5 to about 36 weight percent (wt. %), about 0.5 to about 25 wt. %, specifically about 1 to about 15 wt. %, and more specifically about 3 to about 10 wt. %, based on the weight of the brine.

Optionally, the treatment compositions contain nutrients to ensure microbes' survival and multiplication. The nutrients are known to those skilled in the art. They provide the microbes with a source of carbon, nitrogen, and/or other elements essential for their physiological function. If several types of microbes are used, it may be necessary to use different nutrients, corresponding to the needs of each type of microbes. Exemplary nutrients include yeast extract, peptone from soy, industry byproducts such as lactose mother liquor, and corn steep liquor.

The treatment compositions can also comprise an enzyme stabilizer. Exemplary stabilizers include but are not limited to casein, albumin, powdered milk, whey protein, or bovine serum albumin, or a combination comprising at least one of the foregoing. The presence of enzyme stabilizers can enhance the activity of the enzymes. In an embodiment an enzyme stabilizer increases the carbonate salt precipitation compared to the same composition without the stabilizer, specifically, the amount of the precipitated carbonate salt formed from an enzyme in the presence of an enzyme stabilizer is about two times greater, five times greater, or ten times greater than the amount of the precipitated carbonate salt formed from an enzyme without the stabilizer.

In an embodiment, the treatment compositions further comprise carbonic anhydrase. Any of the carbonic anhydrase in the families of $\alpha, \beta, \gamma, \delta$ and $\epsilon$ can be used. Carbonic anhydrase catalyzes the reaction of carbon dioxide with water to form a carbonic acid.

Optionally, the treatment compositions further comprise an aggregate. The term "aggregate" is used broadly to refer to a number of different types of both coarse and fine particulate material, including, but are not limited to, sand, gravel, ceramics, slag, recycled concrete, silica, glass spheres, limestone, feldspar, and crushed stone such as chert, quartzite, and granite. The fine aggregates are materials that almost entirely pass through a Number 4 sieve (ASTM C 125 and ASTM C 33). The coarse aggregate are materials that are predominantly retained on a Number 4 sieve (ASTM C 125 and ASTM C 33). In an embodiment, the aggregate has a size from about 1 µm to about 2000 µm, specifically about 10 µm to about 1000 µm, and more specifically about 10 µm to about 500 µm. As used herein, the size of an aggregate refers to the largest dimension of the aggregate.

Aggregate can be present in an amount of about 10% to about 95% by weight of the treatment compositions, 10% to about 85% by weight of the treatment compositions, 10% to about 70% by weight of the treatment compositions, 20% to about 80% by weight of the treatment compositions, 20% to about 70% by weight of the treatment compositions, 20% to about 60% by weight of the treatment compositions, about 20% to about 40% by weight of the treatment compositions, 40% to about 90% by weight of the treatment compositions, 50% to about 90% by weight of the treatment compositions, 50% to about 80% by weight of the treatment compositions, or 50% to about 70% by weight of the treatment compositions.

Depending on the end-use, the treatment compositions can also contain a reinforcing agent, a self-healing additive, a fluid loss control agent, a weighting agent to increase density, an extender to lower density, a foaming agent to reduce density, a dispersant to reduce viscosity, a thixotropic agent, a bridging agent or lost circulation material, a clay stabilizer, or a combination comprising at least one of the foregoing. These additive components are selected to avoid imparting unfavorable characteristics to the treatment compositions, and to avoid damaging the wellbore or subterranean formation. Each additive can be present in amounts known generally to those of skill in the art.

The aqueous carrier fluid of the treatment compositions can be foamed with a liquid hydrocarbon or a gas or liquefied gas such as nitrogen, or air. The compositions can further be foamed by inclusion of a non-gaseous foaming agent. The non-gaseous foaming agent can be amphoteric, cationic, or anionic. Suitable amphoteric foaming agents include alkyl betaines, alkyl sultaines, and alkyl carboxylates. Suitable anionic foaming agents can include alkyl ether sulfates, ethoxylated ether sulfates, phosphate esters, alkyl ether phosphates, ethoxylated alcohol phosphate esters, alkyl sulfates, and alpha olefin sulfonates. Suitable cationic foaming agents can include alkyl quaternary ammonium salts, alkyl benzyl quaternary ammonium salts, and alkyl amido amine quaternary ammonium salts. A foam system is mainly used in low pressure or water sensitive formations. A mixture of foaming and foam stabilizing dispersants can be used. Generally, the mixture can be included in the treatment compositions in an amount of about 1% to about 5% by volume of water in the treatment compositions.

In general, the components of the treatment compositions can be premixed or is injected into the wellbore without mixing, e.g., injected "on the fly" where the components are combined as they are being injected downhole. A pumpable or pourable treatment composition can be formed by any suitable method. In an exemplary embodiment, the components of the treatment compositions are combined using conventional mixing equipment or equipment used in downhole operations. The treatment compositions can then be injected, e.g., pumped and placed by various conventional pumps and tools to any desired location within the wellbore. In an embodiment, injecting the treatment compositions comprises pumping the compositions via a tubular in the wellbore. For example, the treatment compositions can be pumped into an annulus between a tubular and a wall of the wellbore via the tubular.

Once the treatment compositions have been place in the desired location, the compositions are allowed to set. Without wishing to be bound by theory, it is believed that during setting, the microbe or enzyme hydrolyzes the substrate or the geobacter oxidizes the organic feedstock, producing carbon dioxide. The carbon dioxide dissolves in water producing carbonic acid, which can react with the cation source to form a carbonate precipitate.

The precipitated carbonate salt partially fills the gaps among aggregates, formation particles, or a combination thereof thus consolidating the aggregates or formation particles or locking the aggregates or particles together. Depending on the requirements of a particular application, the microbes or enzymes or geobacters are present in an amount such that the consolidated aggregates or consolidated particles reach at least about 60-90% of its final strength within about 1-10 hours or 2-8 hours after the treatment compositions are pumped downhole.

The treatment compositions can be used in a cementing operation, a zonal isolation operation, a diversion operation, a formation consolidation operation, a sand control operation, a gravel packing operation, or a combination comprising at least one of the foregoing.

The method is particularly useful for cementing a wellbore, which includes injecting, generally pumping, into the wellbore the treatment compositions at a pressure sufficient to displace a drilling fluid, for example a drilling mud, a cement spacer, or the like, optionally with a "lead slurry" or a "tail slurry". The treatment compositions can be introduced between a penetrable/rupturable bottom plug and a solid top plug. Once placed, the treatment compositions is allowed to harden, and in some embodiments, forms a cement plug in the wellbore annulus, which prevents the flow of reservoir fluids between two or more permeable geologic formations that exist with unequal reservoir pressures.

In another exemplary embodiment, a gravel packing operation may be carried out on a wellbore that penetrates a subterranean formation to prevent or substantially reduce the production of formation particles into the wellbore from the formation during production of formation fluids. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. A treatment composition as disclosed herein may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore.

As an alternative to use of a screen, the fines migration control method may use the treatment compositions in accordance with any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel packing screen, may be introduced into a wellbore at pressures below, at or above the fracturing pressure of the formation, such as frac pack, and/or may be employed in conjunction with resins such as sand consolidation resins if so desired.

In an embodiment, the method further comprises forming a fluid-permeable pack from a plurality of particles in the subterranean formation by consolidating the particles with the carbonate precipitate, the proppant pack having a permeability that reduces or substantially prevents the passage of formation particles from the subterranean formation into the wellbore while allows passage of formation fluids from the subterranean formation into the wellbore. The plurality of particles in the subterranean formation include, but are not limited to, aggregates added to the treatment compositions and particles such as fines generated from an acidizing treatment or other well stimulation or remediation operations. The treatment compositions can be used in vertical, horizontal, or deviated wellbores.

Biologically induced precipitation of carbonates can also be used to form a self-healing cemented structure in a downhole environment. Cracked wellbore cement can lead to loss of zonal isolation, gas migration, and other dangerous situations. It can be difficult to locate and fix cracks, especially when the cracks can occur anytime during the lifetime or even after plugging and abandonment of the well. The inventors have found that the problems associated with cracked wellbore cement can be reduced or avoided by using a self-healing composition comprising encapsulated microbes, enzymes, geobacters, or a combination comprising at least one of the foregoing. Encapsulation of the carbonate producing agents in an encapsulant can protect the microbes, enzymes, or geobacters, from the cement, thereby keeping them viable until such a time as the cement might crack, allowing formation fluids to dissolve or disintegrate the encapsulation, releasing the carbonate producing agents, which reacts with a substrate/organic feed stock and eventually leads to the precipitation of carbonate materials that can seal the crack.

In some embodiments, a method of forming a self-healing cemented structure in a downhole environment comprises injecting into the downhole environment a treatment composition comprising: an aqueous carrier; an aggregate; a cementitious material; and a self-healing composition comprising: an encapsulated carbonate producing agent containing a core of a microbe, an enzyme, a geobacter, or a combination comprising at least one of the foregoing and a shell of an encapsulant; and a substrate comprising urea, N-oxyurea, semicarbazide, N,N-dioxyurea, an organic feedstock, or a combination comprising at least one of the foregoing, and forming a self-healing cemented structure. The aqueous carrier, aggregate, microbe, enzyme, geobacter, substrate, and organic feedstock can be the same as disclosed herein above.

The cementitious material can be any material that sets and hardens by reaction with water, and is suitable for forming a set cement downhole, including mortars and concretes. Suitable cementitious materials, including mortars and concretes, can be those typically employed in a wellbore environment, for example those comprising calcium, magnesium, barium, aluminum, silicon, oxygen, and/or sulfur. Such cementitious materials include, but are not limited to, Portland cements, pozzolan cements, gypsum cements, high alumina content cements, silica cements, and high alkalinity cements, or combinations of these. Portland cements are particularly useful. In some embodiments, the Portland cements that are suited for use are classified as Class A, B, C, G, and H cements according to American Petroleum Institute, API Specification for Materials and Testing for Well Cements, and ASTM Portland cements classified as Type I, II, III, IV, and V.

The cementitious material can be present in the treatment compositions in an amount of about 50 to about 95 wt. % based on the total weight of the compositions, preferably about 60 to about 90 wt. % of the weight of the compositions, more preferably about 65 to about 85 wt. %, based on the total weight of the compositions.

The cementitious material can also be a biocement material that contains a carbonate producing agent and a substrate or urea. Alternatively or in addition, the cementitious material is a biocement material that contains a geobacter and an organic feedstock.

The encapsulant comprises polyglutamic acid, polylysine, albumin, lysozyme, gelatin A, protamine sulfate, chondroitin sulfate, or a combination comprising at least one of the foregoing. If necessary, the substrate and/or organic feedstock is also encapsulated with an encapsulant comprising polyglutamic acid, polylysine, albumin, lysozyme, gelatin A, protamine sulfate, chondroitin sulfate, or a combination comprising at least one of the foregoing. The encapsulant for the substrate and feedstock can be the same or different as the encapsulant for the microbes, enzymes, and geobacters.

In some embodiments, the core of the encapsulated carbonate producing agent comprises a bacterial spore. Bacterial spore is produced by a microbe from a genus selected from *Bacillus* sp., *Sporosarcina* sp., *Spoloactobacilus* sp., *Clostridium* sp., *Desulfotomaculum* sp., or a combination thereof. The bacteria spores remained healthy but dormant until they are released and acceptable environmental conditions for bacterial growth are met. The carbonate producing agent can be encapsulated together with a substrate. The carbonate producing agent and the substrate can also be separately encapsulated.

The self-healing composition can further comprise a cation source. When the carbonate producing agent comprises a bacterial spore, the carbonate producing agent is encapsulated together with the substrate and the cation source. In other embodiments, the carbonate producing agent, the substrate, and the cation source are separately encapsulated.

The thickness of the shell is adjusted to provide the desired controlled release of the microbes or enzymes or geobacters. In an embodiment, the total thickness of the shell is about 0.1 to about 50 micrometers. Within this range, the thickness may be greater than or equal to about 0.5 micrometer, or greater than or equal to 1 micrometers. Also within this range the thickness may be less than or equal to 25, or less than or equal to 10 micrometers.

The encapsulated carbonate producing agent can be manufactured by various methods such as spray coating (for example, top, bottom, or side spray coating), drum coating, pan coating, fluid bed coating, continuous pour coating, or any other method known to those of skill in the art. The encapsulated substrate and encapsulated cation source can be manufactured in a similar manner.

The cemented structures can repair or heal themselves when compromised. When a crack forms in the cemented structure, the components in the self-healing compositions can be released or leached out forming carbonate precipitate. The formed carbonate precipitate can fill the cracks in the cemented structure thus heal the cemented structure. In an embodiment, the method further comprises releasing the carbonate producing agent from the self-healing composition when a crack forms in the cemented structure. Releasing the carbonate producing agent comprises dissolving or disintegrating the encapsulant with formation water under downhole conditions.

Set forth below are various embodiments of the disclosure.

Embodiment 1. A method of enhancing carbonate precipitation in a downhole environment, the method comprising:
  introducing into the downhole environment a treatment fluid comprising:
  a carbonate producing agent comprising a microbe, an enzyme, or a combination comprising at least one of the foregoing, and
  a substrate comprising N-oxyurea, semicarbazide, N,N-dioxyurea, or a combination comprising at least one of the foregoing; and
  forming a carbonate precipitate;
  wherein greater than about 70 wt % of the substrate is consumed in one or more reactions to produce the carbonate precipitate.

Embodiment 2. The method of Embodiments 1, wherein the carbonate precipitate is formed in the presence of a cation source comprising ions of Be, Mg, Ca, Sr, Ba, Mn, Fe, Co, Ni, Cu, Ag, Zn, Cd, Al, Tl, Pb, Bi, or a combination comprising at least one of the foregoing.

Embodiment 3. The method of Embodiments 2, wherein the treatment fluid comprises the cation source.

Embodiment 4. The method of any one of Embodiments 1 to 3, wherein greater than about 80 wt. % of the substrate is consumed in one or more reactions to produce the carbonate precipitate.

Embodiment 5. The method of any one of Embodiments 1 to 4, wherein the method has improved carbonate precipitate conversion rate as compared to a reference method where urea is used instead of the substrate comprising N-oxyurea, semicarbazide, N,N-dioxyurea, or a combination comprising at least one of the foregoing.

Embodiment 6. The method of any one of Embodiments 1 to 5, further comprising performing a cementing operation, a zonal isolation operation, a diversion operation, a formation consolidation operation, a sand control operation, a gravel packing operation, or a combination comprising at least one of the foregoing.

Embodiment 7. The method of any one of Embodiments 1 to 6, wherein microbe is from a genus selected from *Bacillus* sp., *Sporosarcina* sp., *Spoloactobacilus* sp., *Clostridium* sp., *Desulfotomaculum* sp., or a combination thereof; and the enzyme comprises urease, amidase, carbonic anhydrase, glutamate dehydrogenase, glutamate synthase, or a combination comprising at least one of the foregoing.

Embodiment 8. The method of any one of Embodiments 1 to 7, wherein the cation source comprises calcium chloride, calcium bromide, calcium nitrate, or a combination comprising at least one of the foregoing.

Embodiment 9. The method of any one of Embodiments 1 to 8, wherein the treatment fluid further comprises an enzyme stabilizer, a nutrient for the microbe, an aggregate, carbonic anhydrase, or a combination comprising at least one of the foregoing.

Embodiment 10. A method of treating a wellbore or a subterranean formation, the method comprising:
  injecting into the wellbore or the subterranean formation a treatment composition comprising:
    an organic feedstock;
    a sugar source; and
    a geobacter effective to oxidize the organic feedstock to produce carbon dioxide; and
  forming a carbonate precipitate.

Embodiment 11. The method of Embodiments 10, wherein the carbonate precipitate is formed in the presence of a cation source comprising ions of Be, Mg, Ca, Sr, Ba, Mn, Fe, Co, Ni, Cu, Ag, Zn, Cd, Al, Tl, Pb, Bi, or a combination comprising at least one of the foregoing.

Embodiment 12. The method of Embodiments 11, wherein the treatment fluid comprises the cation source.

Embodiment 13. The method of any one of Embodiments 10 to 12, wherein the organic feedstock comprises proteins, fatty acids, or a combination comprising at least one of the foregoing.

Embodiment 14. The method of any one of Embodiments 10 to 13, wherein the geobacter comprises proteobacteria.

Embodiment 15. The method of any one of Embodiments 10 to 14, wherein the carbonate precipitate is formed in the presence of water.

Embodiment 16. The method of any one of Embodiments 10 to 15, wherein the treatment composition further comprises a carbonic anhydrase.

Embodiment 17. The method of any one of Embodiments 10 to 16, wherein the treatment composition further comprises an aggregate.

Embodiment 18. The method of any one of Embodiments 10 to 17, further comprising performing a cementing operation, a zonal isolation operation, a diversion operation, a formation consolidation operation, a sand control operation, a gravel packing operation, or a combination comprising at least one of the foregoing.

Embodiment 19. The method of any one of Embodiments 10 to 18, further comprising
forming a fluid-permeable pack from a plurality of particles in the subterranean formation by consolidating the particles with the carbonate precipitate,
the proppant pack having a permeability that reduces or substantially prevents the passage of formation particles from the subterranean formation into the wellbore while allows passage of formation fluids from the subterranean formation into the wellbore.

Embodiment 20. A method of forming a self-healing cemented structure in a downhole environment, the method comprising:
injecting into the downhole environment a treatment composition comprising:
an aqueous carrier;
an aggregate;
a cementitious material; and
a self-healing composition comprising:
an encapsulated carbonate producing agent containing a core of a microbe, an enzyme, a geobacter, or a combination comprising at least one of the foregoing and a shell of an encapsulant, and
a substrate comprising urea, N-oxyurea, semicarbazide, N,N-dioxyurea, an organic feedstock, or a combination comprising at least one of the foregoing; and
forming a self-healing cemented structure.

Embodiment 21. The method of Embodiments 20, wherein the encapsulant comprises polyglutamic acid, polylysine, albumin, lysozyme, gelatin A, protamine sulfate, chondroitin sulfate, or a combination comprising at least one of the foregoing.

Embodiment 22. The method of Embodiments 20 or Embodiments 21, wherein the core of the encapsulated carbonate producing agent comprises a bacterial spore.

Embodiment 23. The method of any one of Embodiments 20 to 22, wherein the substrate is encapsulated with an encapsulant comprising polyglutamic acid, polylysine, albumin, lysozyme, gelatin A, protamine sulfate, chondroitin sulfate, or a combination comprising at least one of the foregoing.

Embodiment 24. The method of any one of Embodiments 20 to 23, wherein the self-healing composition further comprises a cation source comprising ions of Be, Mg, Ca, Sr, Ba, Mn, Fe, Co, Ni, Cu, Ag, Zn, Cd, Al, Tl, Pb, Bi, or a combination comprising at least one of the foregoing.

Embodiment 25. The method of Embodiments 24, wherein the cation source is encapsulated with an encapsulant comprising polyglutamic acid, polylysine, albumin, lysozyme, gelatin A, protamine sulfate, chondroitin sulfate, or a combination comprising at least one of the foregoing.

Embodiment 26. The method of any one of Embodiments 20 to 25, wherein the core of the encapsulated carbonate producing agent comprises a bacterial spore, and the carbonate producing agent is encapsulated together with the substrate.

Embodiment 27. The method of Embodiments 24 or Embodiments 25, wherein the core of the encapsulated carbonate producing agent comprises a bacterial spore, and the carbonate producing agent is encapsulated together with the substrate and the cation source.

Embodiment 28. The method of any one of Embodiments 20 to 27 further comprising releasing the carbonate producing agent from the self-healing composition when a crack forms in the cemented structure.

Embodiment 29. The method of Embodiments 28, wherein releasing the carbonate producing agent comprises dissolving or disintegrating the encapsulant with formation water.

Embodiment 30. The method of Embodiments 28 or Embodiments 29, further comprising forming a carbonate precipitate to fill the crack in the cemented structure.

Embodiment 31. The method of any one of Embodiments 20 to 30, wherein the bacterial spore is produced by a microbe from a genus selected from *Bacillus* sp., *Sporosarcina* sp., *Spoloactobacilus* sp., *Clostridium* sp., *Desulfotomaculum* sp., or a combination thereof.

Embodiment 32. The method of any one of Embodiments 20 to 31, wherein the enzyme comprises urease, amidase, carbonic anhydrase, glutamate dehydrogenase, glutamate synthase, or a combination comprising at least one of the foregoing.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A method of enhancing carbonate precipitation in a downhole environment, the method comprising:
introducing into the downhole environment a treatment composition comprising:
a carbonate producing agent comprising a microbe, an enzyme, or a combination comprising at least one of the foregoing, and
a substrate comprising N-oxyurea, semicarbazide, N,N-dioxyurea, or a combination comprising at least one of the foregoing;
hydrolyzing the substrate to produce carbon dioxide; and
reacting carbon dioxide with a cation source forming a carbonate precipitate, the cation source comprising ions of Be, Mg, Ca, Sr, Ba, Mn, Fe, Co, Ni, Cu, Ag, Zn, Cd, Al, Tl, Pb, Bi, or a combination comprising at least one of the foregoing;
wherein the substrate further comprises greater than zero percent to less than 40 wt % of urea based on a total weight of the substrate; and
wherein the method has an improved carbonate precipitate yield as compared to a reference method where urea is used instead of the substrate.

2. The method of claim 1, wherein the microbe is from a genus selected from *Bacillus* sp., *Sporosarcina* sp., *Spoloactobacilus* sp., *Clostridium* sp., *Desulfotomaculum* sp., or a combination thereof; and the enzyme comprises urease, amidase, carbonic anhydrase, glutamate dehydrogenase, glutamate synthase, or a combination comprising at least one of the foregoing.

3. The method of claim 1, wherein the treatment composition further comprises an enzyme stabilizer, a nutrient for the microbe, an aggregate, carbonic anhydrase, or a combination comprising at least one of the foregoing.

4. The method of claim 1, wherein the treatment composition comprises the cation source, and the cation source comprises calcium chloride, calcium bromide, calcium nitrate, or a combination comprising at least one of the foregoing.

5. The method of claim 1, further comprising performing a cementing operation, a zonal isolation operation, a diversion operation, a formation consolidation operation, a sand control operation, a gravel packing operation, or a combination comprising at least one of the foregoing.

6. The method of claim 1, wherein the substrate further comprises greater than zero percent to less than 20 wt % or urea, based on the total weight of the substrate.

7. The method of claim 1, wherein greater than about 70 wt % of the substrate is consumed in one or more reactions to produce the carbonate precipitate.

8. The method of claim 1, wherein greater than about 80 wt % of the substrate is consumed in one or more reactions to produce the carbonate precipitate.

9. The method of claim 1, wherein the substrate is present in an amount of about 5 mM to about 2 M in the treatment composition.

\* \* \* \* \*